(12) United States Patent
Sampaio de Almeida Cardoso et al.

(10) Patent No.: US 12,545,827 B2
(45) Date of Patent: Feb. 10, 2026

(54) COMBINED TREATMENT PROCESS FOR REMOVING AND INHIBITING SCALE

(71) Applicants: Petróleo Brasileiro S.A.—Petrobras, Rio de Janeiro (BR); Universidade Federal do Rio de Janeiro—UFRJ, Rio de Janeiro (BR)

(72) Inventors: Giuseppe Sampaio de Almeida Cardoso, Rio de Janeiro (BR); Francisca Ferreira do Rosario, Rio de Janeiro (BR); Humberto Eustaquio Lopes, Rio de Janeiro (BR); Alexandre Barbosa Melo de Carvalho, Rio de Janeiro (BR); Felipe Batista Alvim, Rio de Janeiro (BR); João Francisco Cajaiba da Silva, Rio de Janeiro (BR); Tiago Cavalcante Freitas, Rio de Janeiro (BR)

(73) Assignees: Petróleo Brasileiro S.A.—Petrobras, Rio de Janeiro (BR); Universidade Federal do Rio de Janeiro—UFRJ, Rio de Janeiro (BR)

( * ) Notice: Subject to any disclaimer, the term of this patent is extended or adjusted under 35 U.S.C. 154(b) by 61 days.

(21) Appl. No.: 17/781,215

(22) PCT Filed: Nov. 19, 2020

(86) PCT No.: PCT/BR2020/050491
§ 371 (c)(1),
(2) Date: May 31, 2022

(87) PCT Pub. No.: WO2021/102545
PCT Pub. Date: Jun. 3, 2021

(65) Prior Publication Data
US 2023/0002667 A1    Jan. 5, 2023

(30) Foreign Application Priority Data

Nov. 29, 2019   (BR) ..................... 10 2019 025415 7

(51) Int. Cl.
C09K 8/52      (2006.01)
C09K 8/528     (2006.01)
E21B 37/06     (2006.01)

(52) U.S. Cl.
CPC .............. *C09K 8/528* (2013.01); *E21B 37/06* (2013.01)

(58) Field of Classification Search
CPC . C09K 8/528; C09K 8/32; C09K 8/54; C09K 2208/32; C09K 8/52; C23F 14/02;
(Continued)

(56) References Cited

U.S. PATENT DOCUMENTS 2,177,345 A * 10/1939  Loomis ................. C09K 8/536
                                                    507/268
3,481,869 A * 12/1969  Jones ..................... C02F 5/145
                                                    507/236
(Continued)

FOREIGN PATENT DOCUMENTS

CN    102718332 A    10/2012
CN    106190073 A    12/2016
(Continued)

OTHER PUBLICATIONS

Elayatt et al. (2016) "Evaluation of Diethylene Triamine-pentamethylene Phosphonic Acid (DTPMP) as Scale Inhibitor of Calcium Carbonate Scales in Oil Field Water", American Journal of Engineering Research, 5(12):130-142.
(Continued)

*Primary Examiner* — Edwin J Toledo-Duran
(74) *Attorney, Agent, or Firm* — Morrison & Foerster LLP

(57) ABSTRACT

The present invention proposes a combined treatment of scale removal and inhibition in reservoir rock (inhibition
(Continued)

squeeze), by using inhibitors derived from organophosphonic acid, in acidic medium, aiming at minimizing the intervention time in well scale mitigation operations, in addition to reducing costs per treatment and the risks associated with the process.

3 Claims, 2 Drawing Sheets

(58) Field of Classification Search
CPC ..... C23F 11/10; C23F 11/167; C23F 11/1676; C23G 1/26; E21B 37/06; C10G 75/02
See application file for complete search history.

(56) References Cited

U.S. PATENT DOCUMENTS

| | | | | |
|---|---|---|---|---|
| 5,038,861 | A * | 8/1991 | Shuler | C09K 8/528 166/305.1 |
| 5,181,567 | A * | 1/1993 | Shuler | C09K 8/528 507/224 |
| 6,379,612 | B1 * | 4/2002 | Reizer | C09K 8/528 422/15 |
| 9,108,866 | B2 * | 8/2015 | Notte | C02F 5/12 |
| 2006/0155473 | A1 * | 7/2006 | Soliman | E21B 49/00 702/12 |
| 2007/0162235 | A1 * | 7/2007 | Zhan | E21B 49/008 702/6 |
| 2010/0186961 | A1 * | 7/2010 | Notte | C02F 5/12 548/119 |
| 2011/0124533 | A1 * | 5/2011 | Notte | C09K 8/528 210/700 |
| 2012/0252706 | A1 * | 10/2012 | Steiner | C09K 8/70 507/269 |
| 2012/0325485 | A1 | 12/2012 | Qu et al. | |
| 2014/0296113 | A1 * | 10/2014 | Reyes | C09K 8/74 510/109 |
| 2016/0009980 | A1 * | 1/2016 | Gupta | E21B 37/06 507/202 |
| 2016/0076369 | A1 * | 3/2016 | Ziauddin | E21B 43/25 703/2 |
| 2016/0333669 | A1 * | 11/2016 | Mello | E21B 43/267 |
| 2017/0226404 | A1 * | 8/2017 | Gupta | C01F 7/30 |
| 2018/0282606 | A1 * | 10/2018 | Rodgers | C09K 8/528 |
| 2019/0177603 | A1 * | 6/2019 | Abad | C09K 8/506 |
| 2020/0124534 | A1 * | 4/2020 | Murugesan | C09K 8/03 |
| 2020/0327481 | A1 * | 10/2020 | Allouche | E21B 41/00 |
| 2020/0339871 | A1 * | 10/2020 | Obot | C23F 11/173 |
| 2020/0369951 | A1 * | 11/2020 | Quraishi | E21B 43/26 |
| 2021/0246766 | A1 * | 8/2021 | Wilson, III | G06F 3/04847 |
| 2021/0332681 | A1 * | 10/2021 | Hamza | C09K 8/80 |
| 2022/0120159 | A1 * | 4/2022 | Chen | C09K 8/584 |
| 2022/0195286 | A1 * | 6/2022 | Ziauddin | C09K 8/86 |

FOREIGN PATENT DOCUMENTS

| | | |
|---|---|---|
| WO | 2014004697 A2 | 1/2014 |
| WO | 2021102545 A1 | 6/2021 |

OTHER PUBLICATIONS

Lo et al. (2011) "Scale Control and Inhibitor Evaluation of an Alkaline Surfactant Polymer Flood", SPE-141551, 10 pages.

Tantayakom et al. (2005) "Kinetic Study of Scale Inhibitor Precipitation in Squeeze Treatment", Crystal Growth & Design, 5(1):329-335.

Rebeschini, Jordani. Evaluating Chemical additives as Barium Sulphate Dissolvers for Oil Producer Wells. Campinas: Faculdade de Engenharia Mecânica, Universidade Estadual de Campinas, 2010. 136 p. Dissertação (Mestrado).

Cardoso (2015) "Study of increasing the efficiency of the treatment to inhibit scale by increasing the release/retention ratio of inhibitors in the rock-reservoir," ("Estudo do aumento da eficiência do tratamento de inibição da incrustação a partir do aumento da razão liberarção/retenção de inibidores na rocha-reservatório,") Master's Dissertation, Darcy Ribeiro State University of North Fluminense, Science and Technology Center, Exploration and Production Engineering Laboratory Oil; pp. 1-282.

Queiroz et al. (Dec. 2017). "The Influence of Acid Stimulation and Scale Squeeze Treatments on the Index of Productivity of Producing Wells," ("A Influência dos Tratamentos de Estimulação Acida e Scale Squeeze sobre o Índice de Produtividade de Poços Produtores") Final Course Work, Fluminense Federal University School of Engineering, pp. 1-198.

Rebeschini, J. (Jul. 2010). "Evaluation of Mitigation of Inorganic Barium Sulfate Scaling in Oil Wells with Numerical Simulation Aid," UNISIM On-Line 7(52): 1-276.

International Search Report and Written Opinion dated Feb. 9, 2021, directed to International Patent Application No. PCT/BR2020/050491; 13 pages.

\* cited by examiner

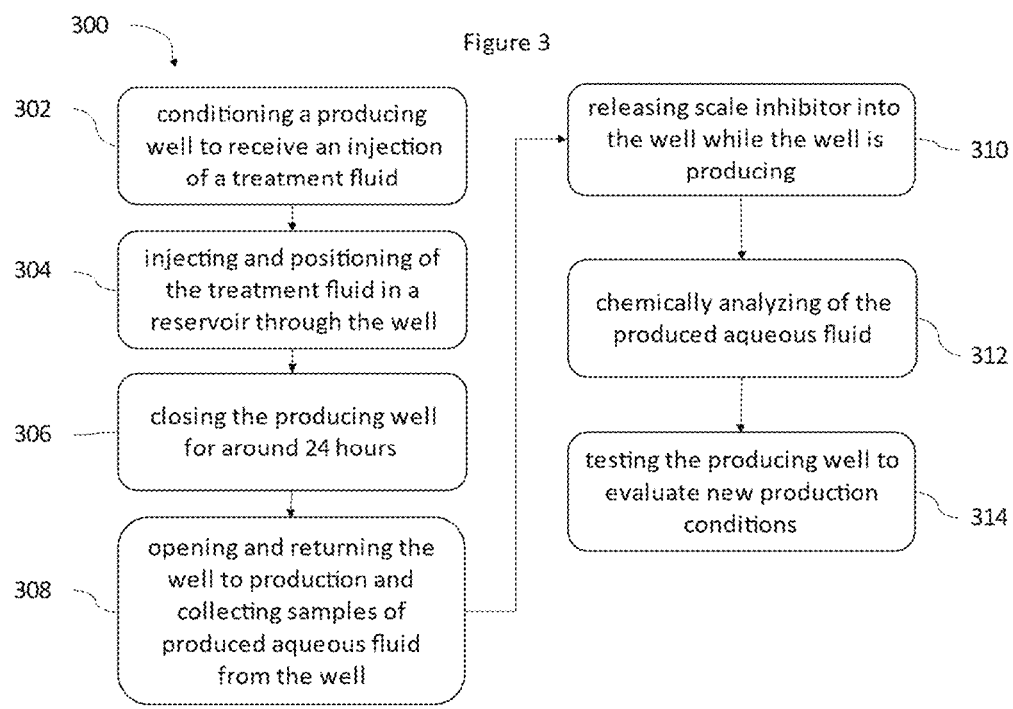

COMBINED TREATMENT PROCESS FOR REMOVING AND INHIBITING SCALE

FIELD OF THE INVENTION

The present invention proposes a combined treatment of removal and inhibition of scale in reservoir rock (inhibition squeeze), by using inhibitors derived from organophosphonic acid, in acidic medium, aiming at minimizing the intervention time in operations of mitigation of scales in wells, in addition to reducing treatment costs and the risks associated with the process.

DESCRIPTION OF THE STATE OF THE ART

The treatment to mitigate the occurrence of fouling in wells normally used in the oil industry is called inhibition squeeze. Squeeze generally consists of periodic injections of inhibitor into the reservoir from the producing well to prevent scale deposition (REBESCHINI, 2010, *"Evaluation of chemical additives to dissolve inorganic scale of barium sulfate in oil wells. State University of Campinas, Campinas"*). In the case of the presence of deposits, removal can take place mechanically (maceration, hydroblasting, scraping), if the location is easily accessible, as in surface installations, or chemically, when the location of deposits is difficult to access, or where mechanical methods are unfeasible, such as in the reservoir. The chemical treatment is usually done with the use of removers of acidic character. The scale removal techniques must be fast, considering the high cost of a workover operation; however, without damaging the formation. When choosing the most appropriate treatment, it is necessary to know some preliminary information, such as the location of the deposit, the amount, the chemical composition, and the texture of the solids present, in order to avoid their recurrence (REZENDE et al., 2009, *ROS—Remote Operations Simulator. III National Meeting of Hydraulics of Wells, Campos do Jordão, SP, June 7 to 10;* REBESCHINI, 2010, *Evaluation of the Mitigation of Inorganic Fouling of Barium Sulfate in Oil Wells with the Assistance of Numerical Simulation. Edition 52, year 5 volume 7*).

The dissolution and/or scale removal treatments and the squeeze treatment of scale inhibitor in oil producing reservoirs and wells are currently carried out in different steps and using different chemicals. These treatments imply the interruption of production in the well, generating production losses, in addition to the risks associated with multiple processes for carrying out these treatments separately.

Currently, there are several products applied in the inhibition of inorganic scale in the oil industry, which have the function of preventing the formation of saline deposits of calcium carbonate and barium and strontium sulfates, the most common types of scale in operations of oil production. Among these inhibitors, organophosphonic acids (phosphonates) stand out, which are more efficient in inhibiting. Particularly, considering the high solubility of calcium carbonate in acidic medium, a certain level of dissolution of the reservoir rock can be reached by using organophosphonic compounds (phosphonates) in acidic solution, followed by retention of the inhibitor molecule in the rock formation for future inhibition of scale formation in the porous medium.

In "Cardoso, G. S. A., (2015). *Study of increasing the efficiency of the treatment to inhibit scale by increasing the release/retention ratio of inhibitors in the rock-reservoir* (Master's Dissertation, UENF, Macaé, R J)" there is disclosed a process widely applied and directed to the inhibition of scales, not being, however, effective for the removal of deposits, although the treatment involves the use of a product derived from phosphonic acid.

Document "Tantayakom, V., Fogler, H. S., Charoensirithavorn, P., Chavadej, S. (2005). *Kinetic Study of Scale Inhibitor Precipitation in Squeeze Treatment, Crystal Growth & Design,* 5 (1) 239-335" discloses a common method of preventing scale formation by means of the use of scale inhibitors such as (aminotris methylenephosphonic) acid (ATMP). This article presents the use of phosphonic acids and/or derivatives thereof with the sole objective of retaining the inhibitor by precipitation in the reservoir rock.

Document "Elayatt, A. K., Altarhoni, H. K., Elaoud, M. A. M., (2016). *Evaluation of Diethylene Triamine pentamethylene Phosphonic Acid (DTPMP) as Scale Inhibitor of Calcium Carbonate Scales in Oil Field Water,* American Journal of Engineering Research, 5 (12) 130-142" addresses to phosphonates used as a calcium carbonate scale inhibitor, in which a continuous inhibitor dosing is suggested. In the evaluation of inhibitors, the application of the diethylenetriamine penta(methylenephosphonic acid) inhibitor, DTPMP, stands out.

Document "Queiroz, A. C. C. & Silva, S. J. P. (2017). *The Influence of Acidic Stimulation and Scale Squeeze Treatments on the Productivity Index of Producing Wells* (Final Term Paper, UFF, Niterói, R J)" discloses a study on the effectiveness of the combination of acidic stimulation and scale squeeze treatments in counteracting the appearance of scale in oil wells and reservoirs. This process sequentially combines two distinct treatments, applied to a siliciclastic reservoir, specifically sized with pills to avoid swelling of clay minerals.

Document "Rebeschini, J. (2010). *Evaluation of chemical additives to dissolve inorganic scale of barium sulfate in oil wells.* (Master's Dissertation, UNICAMP, Campinas, SP)" presents an evaluation of chemical additives to specifically dissolve barium sulfate scale in oil wells. The process is based on the comparison of chelators, such as pentasodium diethylenetriaminepentaacetic acid (DTPA) with diesters, addressing to conditions of non-miscibility in water of diesters and the need for studies to evaluate an emulsifier with adequate HLB (hydrophilic lipophilic balance); that is, that does not compromise the properties of the diester in an aqueous medium.

Document CN102718332A specifically discloses a removal and inhibition process in industrial circulating water systems, involving fresh water (low salinity) and surface operating equipment.

The present invention contributes to minimize the workover time, combining two different treatments in just one. This combination, in addition to reducing well intervention time, reduces costs per treatment, and also minimizes the risks associated with the multiple steps required to carry out these treatments separately.

The present invention also involves a critical step of interaction with the reservoir rock in an aqueous medium of high salinity, in a wide range of temperature and pressure.

In addition, the present invention results in an innovation for the management of scale in the oil industry, bringing benefits associated with greater process efficiency (injection of a single treatment fluid). There is estimated a reduction of at least half of the production downtime, in addition to the reduction of operational risks and costs with logistics and chemical products.

No document of the state of the art discloses a combined treatment of dissolution and inhibition of scale with the use of organophosphonic acids (phosphonates) such as the one of the present invention.

BRIEF DESCRIPTION OF THE INVENTION

The present invention addresses to a process developed to minimize the intervention time in oil producing wells, simultaneously combining two different treatments in just one. This combination, in addition to reducing intervention time, reduces costs per treatment, and also minimizes associated risks. More specifically, the invention comprises a combined treatment of scale removal and inhibition in reservoir rocks (squeeze), using inhibitors derived from organophosphonic acid, with formulation in acidic medium.

BRIEF DESCRIPTION OF DRAWINGS

The present invention will be described in more detail below, with reference to the attached figures which, in a schematic form and not limiting the inventive scope, represent examples of its embodiment. In the drawings, there are.

DETAILED DESCRIPTION OF THE INVENTION

Upon taking the limitations found in the State of the Art into account, the solution addressed in the present invention comprises a combined treatment of scale removal and inhibition (inhibition squeeze) in reservoir rock, using an inhibitor derived from organophosphonic acid in acidic medium. Considering the limitations found in the State of the Art, the solution addressed to in the present invention comprises a combined treatment of removal and inhibition of scale (inhibition squeeze) in reservoir rock, using an inhibitor derived from organophosphonic acid in an acidic medium. The present invention will now be described in detail with reference to the above-mentioned Figures, which in no way signify or represent restrictions that may be imposed on the inventive scope claimed herein.

Example 1: Permeability Analysis

The intensity and extent of the dissolution of the reservoir rock sample was evaluated by verifying the change in the permeability of the sample caused by the treatment with different inhibitors, as can be seen in Table 1.

TABLE 1

Comparison of permeabilities pre- and post-main treatment (dissolution by inhibitor) and evaluation of permeability damage.

|  | ATMP 10% m/v | EABMP 10% v/v | COMMERCIAL PHOSPHONATE |
|---|---|---|---|
| Initial effective permeability to water—Kw (mD) | 0.38 | 0.18 | 0.75 |
| Initial Effective Permeability to Oil—initial Ko (mD) | 3.56 | 2.39 | 3.59 |
| Final Effective Permeability to water—Kwf (mD) | 442.59 | 0.80 | 0.65 |
| Final Effective Permeability to Oil—Kof (mD) | 89.16 | 4.89 | 3.48 |
| Initial irreducible water saturation—Swi % | 32.90 | 26.50 | N/A |
| Initial residual oil saturation—Ros % | 33.00 | 0.29 | N/A |
| Final irreducible water saturation—Swif % | N/A | 28.46 | N/A |
| Final residual oil saturation—Rosf % | N/A | N/A | N/A |
| Stimulation in relation to Kw | 1164.70 | 4.57 | 0.87 |
| Stimulation in relation to Ko | 25.04 | 2.05 | 0.97 |

Figure 1:
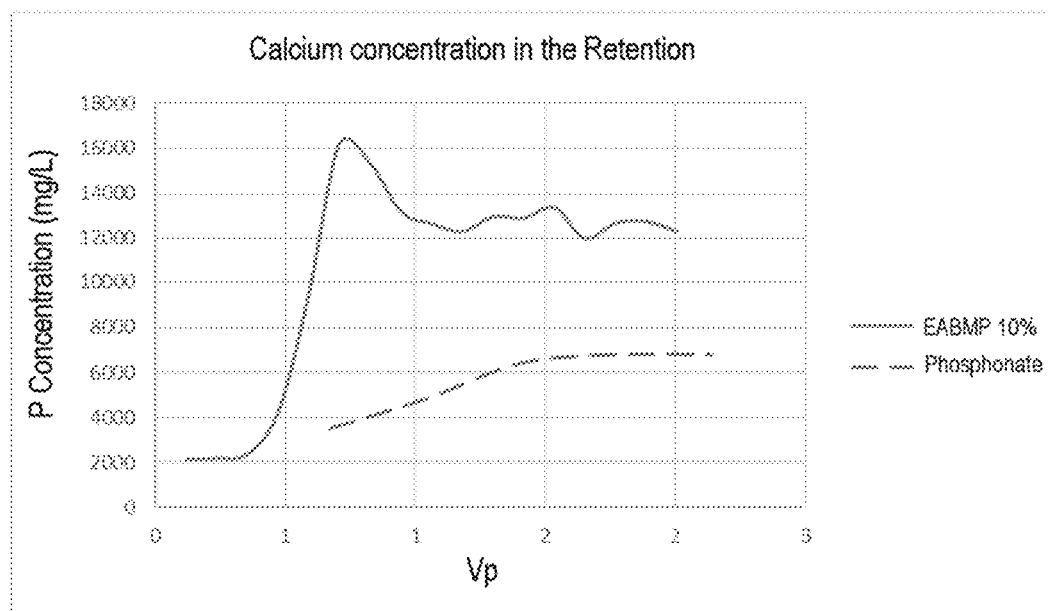
FIG. 1 illustrating a laboratory test with injection of inhibitor fluid in carbonate rock sample with porous volume defined as Vp The calcium concentration was obtained by analyzing the effluent using the ICP-OES technique (optical emission spectroscopy with inductively coupled plasma source). The calcium concentration curves are presented as a function of the number of porous volumes of injected inhibitor fluid (Vp) for the EABMP inhibitors (amino bimethylene phosphonic acid, aqueous solution 10% v/v) and commercial phosphonate, in the retention process of these inhibitors in the porous medium.

Kw—Initial effective permeability to water
Ko—Initial Effective Permeability to Oil
Kwf—Final Effective Permeability to water
Kof—Final Effective Permeability to Oil
Swi—Initial irreducible water saturation
Ros—Initial residual oil saturation
Ros—Initial residual oil saturation
Swif—Final irreducible water saturation
N/A—Not determined FIG. 1 shows that the dissolution of carbonate rock occurs due to the increase in the concentration of calcium in the aqueous medium, during the process of injection and retention of the inhibitor in the rock. The permeability analyses in Table 1 corroborate that the treatment in which there was greater intensity in the dissolution of the calcium carbonate sample was the one that contained ATMP as active matter, since it has a greater amount of phosphonic acid groups, requiring a greater amount of calcium carbonate to neutralize the same. This analysis also evidenced the higher dissolution capacity of EABMP compared to a commercial phosphonate. The commercial phosphonate did not present sufficient dissolution efficiency for the proposed combined treatment, with no increase in permeability after treatment (stimulation).

Example 2: Analysis of Retention and Release of Scale Inhibiting Active Matter As can be seen in FIG. 2, curves were obtained to evaluate the retention of the scale inhibitor during the injection of the solution (main treatment).

The inhibitor solution that contained the EABMP molecule showed satisfactory behavior of dissolution of carbonates, retention in the rock, and release above the minimum effective concentration to inhibit the precipitation of carbonates in the aqueous medium, as evidenced by the concentration of phosphorus in the effluent. As the acid treatment dissolves the calcium carbonate rock sample while retaining the scale-inhibiting molecule, large amounts of calcium carbonate are solubilized in the aqueous medium, increasing the concentration of calcium ion ($Ca^{2+}$) in solution.

Since the ATMP molecule in the presence of $Ca^{2+}$ ions forms a Ca-ATMP complex of low solubility, precipitating in the pores of the rock sample, it was not possible to obtain the phosphorus concentration curve in the effluent as a function of the porous volume of water from injected formation to evaluate the release of ATMP phosphonate in the aqueous phase.

Figure 2:
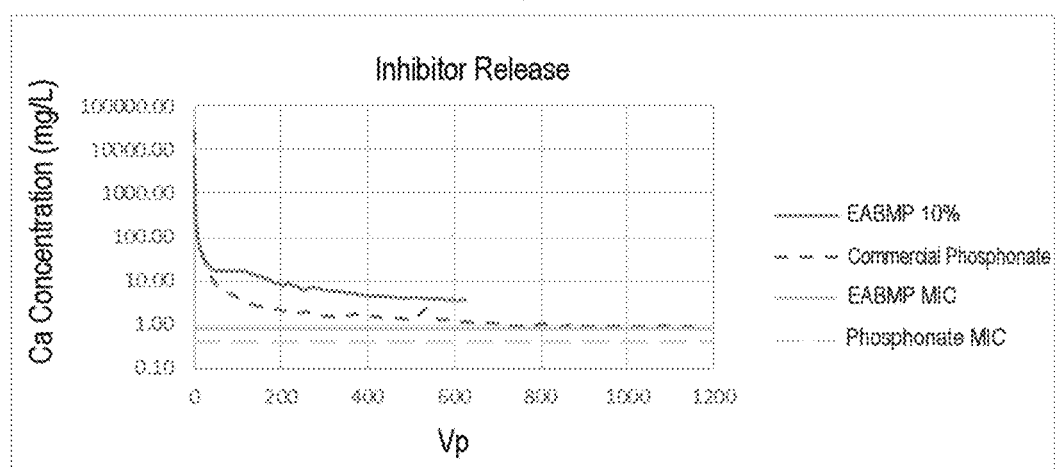
FIG. 2 illustrating the release of organophosphonic acid (inhibitor) in the aqueous stream, after the main treatment, showing a laboratory test with the injection of formation water, in a sample of carbonate rock with porous volume defined as Vp. Phosphorus concentration was obtained by analyzing the effluent using the ICP-OES technique (optical emission spectroscopy with inductively coupled plasma source). The phosphorus concentration curves are presented as a function of the number of porous volumes of injected formation water, showing the release to the aqueous medium of the organophosphonic inhibitors, previously retained in the rock.

In FIG. 2, when analyzing the curve from the moment the injection starts to the point where the inhibitor completely saturates the medium (the reactivity of the medium tends to equilibrium), it is noted that there was a retention of the inhibitor in the porous medium during sample dissolution.

Example 3: Scale Inhibitor Release Analysis

In addition, the release of the scale inhibitor was evaluated in the flow experiment in a porous medium. After the squeeze treatment, the inhibitor was released into the fluid stream during production, inhibiting scale formation for a certain period of time. The objective was to determine the scale inhibition potential of the used solutions containing organophosphonic acids, after the dissolution of a calcium carbonate rock sample, simulating the reopening of the well for production.

The experiments with EABMP and commercial phosphonate showed potential to inhibit scale, and were gradually released into the aqueous fluid stream. In the experiment that contained ATMP as active matter, there was precipitation of the Ca-ATMP complex in the porous medium, and the inhibitor release curve was not obtained with the injection of formation water into the rock.

In both experiments with EABMP and commercial phosphonate, the inhibitor concentration remained above the Minimum Inhibitor Concentration (MIC) required for inhibition. Accordingly, these inhibitors are therefore effective in inhibiting calcium carbonate throughout its useful life (release into the aqueous stream).

The experiment that contained commercial phosphonate in the composition of the main treatment solution had a significant useful life, demonstrating potential to inhibit scale over a certain period of time. However, the commercial phosphonate showed unsatisfactory dissolution for the proposed combined treatment.

The EABMP was efficient in the combined and simultaneous treatment (using a single fluid) of dissolution and inhibition of calcium carbonate scale. There were observed the efficient dissolution, retention and subsequent release of the inhibitor to the aqueous stream at a concentration above the minimum required one, without causing damage, and stimulating the porous rock. The proposed process can be expanded to other classes of organophosphonic acids (phosphonates) that are tolerant to precipitation in the presence of high concentrations of $Ca^{2+}$ ion.

FIG. 3 illustrates a method 300 that can be used with aspects of this disclosure. At 302, a producing well is conditioned to receive an injection of a treatment fluid that acts in the dissolution of the scale. At 304, the treatment fluid is injected and positioned in a reservoir through the well. In some implementations the treatment fluid includes amino bimethylene phosphonic acid. At 306, the producing well is closed for around 24 hours to allow the interaction of the treatment fluid with the reservoir rock. At 308, the well is opened and returned to production. Samples of produced aqueous fluid are collected from the well. At 310, scale inhibitor is released into the well while the well is producing. At 312, the produced aqueous fluid is chemically analyzed. At 314, the producing well is tested to evaluate new production conditions (damage removal and obstruction removal throughout a production system associated with the well), inhibition, and treatment lifetime as a function of an inhibitor release curve.

It should be noted that, although the present invention has been described in relation to the attached figures, it may undergo modifications and adaptations by technicians skilled on the subject, depending on the specific situation, but provided that it is within the inventive scope defined herein.

The invention claimed is:

1. A method to remove and inhibit scale, the method comprising:
    conditioning a producing well to receive an injection of a treatment fluid that acts in the dissolution of the scale;
    injecting and positioning of the treatment fluid in a reservoir through the producing well, the treatment fluid comprising amino bimethylene phosphonic acid;
    closing the producing well for around 24 hours to allow the interaction of the treatment fluid with reservoir rock exposed to the production well;
    opening and returning the producing well to production and collecting samples of produced aqueous fluid from the well;
    releasing scale inhibitor comprising amino bimethylene phosphonic acid previously retained in the reservoir rock from the treatment fluid into the well while the well is producing;
    chemically analyzing of the produced aqueous fluid; and
    testing the producing well to evaluate production conditions, inhibition, and treatment lifetime as a function of an inhibitor release curve.

2. The method of claim 1, wherein the treatment fluid and the scale inhibitor are the same type of fluid.

3. The method of claim 1, wherein the amino bimethylene phosphonic acid has a concentration of 10% v/v.

* * * * *